(12) United States Patent
Lamberton et al.

(10) Patent No.: US 8,327,389 B2
(45) Date of Patent: Dec. 4, 2012

(54) INTERFACE MODULE

(75) Inventors: Marc Lamberton, Antibes (FR); David Mansutti, Valbonne (FR); Olivier Bertin, Peymeinade Alpes-Maritimes (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 943 days.

(21) Appl. No.: 12/375,729

(22) PCT Filed: Jul. 10, 2007

(86) PCT No.: PCT/EP2007/057059
§ 371 (c)(1),
(2), (4) Date: Jan. 30, 2009

(87) PCT Pub. No.: WO2008/015083
PCT Pub. Date: Feb. 7, 2008

(65) Prior Publication Data
US 2009/0257571 A1     Oct. 15, 2009

(30) Foreign Application Priority Data
Jul. 31, 2006    (EP) .................................. 06300841

(51) Int. Cl.
*G06F 9/44* (2006.01)
*G06F 15/16* (2006.01)

(52) U.S. Cl. ........................................ 719/328; 709/202
(58) Field of Classification Search ................... 719/328
See application file for complete search history.

(56) References Cited

U.S. PATENT DOCUMENTS

| | | | |
|---|---|---|---|
| 7,320,017 B1 * | 1/2008 | Kurapati et al. | 709/202 |
| 2002/0083214 A1 | 6/2002 | Heisig et al. | |
| 2003/0023577 A1 * | 1/2003 | Sundius et al. | 707/1 |
| 2004/0105537 A1 * | 6/2004 | Creamer et al. | 379/221.08 |
| 2005/0238050 A1 * | 10/2005 | Pung et al. | 370/469 |

FOREIGN PATENT DOCUMENTS

| | | |
|---|---|---|
| GB | 2408813 A | 6/2005 |
| WO | WO-2004/003770 A1 | 1/2004 |
| WO | PCT/EP2007/057059 | 7/2007 |

* cited by examiner

*Primary Examiner* — Andy Ho
*Assistant Examiner* — Abdou Seye

(57) ABSTRACT

An interface module for a telecommunications network service entity, the interface module being operable to communicate with an application provided on the telecommunications network service entity and a session layer of the telecommunications network service entity, the interface module comprising a generic container to communicate with the application and a protocol connector operable to communicate with an API of the session layer and the generic container, wherein the protocol connector is operable to receive a message from the protocol stack API in accordance with a corresponding protocol, and pass the message to the generic container, which passes the message to the application.

12 Claims, 4 Drawing Sheets

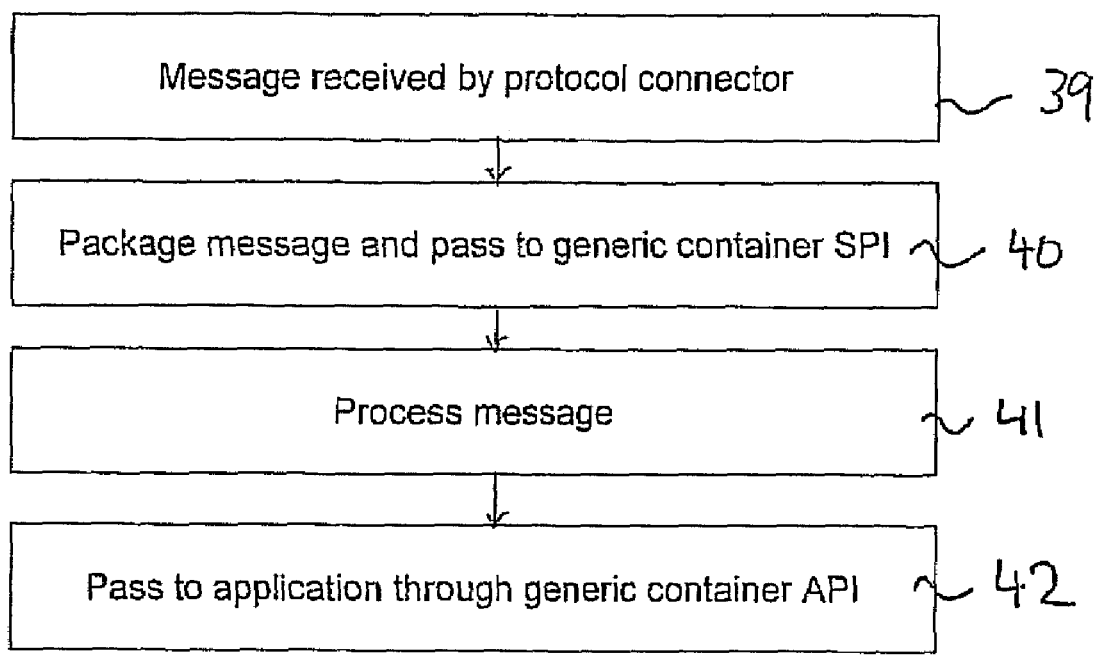

INTERFACE MODULE

The present application claims priority to PCT application number PCT/EP2007/057059, having an international filing date of Jul. 10, 2007, which claims priority to EP patent application serial number 06300841.1, filed Jul. 31, 2006, both of which are incorporated by reference in their entireties.

FIELD OF THE INVENTION

This invention relates to an interface module particularly but not exclusively for supporting services on a telecommunication network service entity.

BACKGROUND OF THE INVENTION

The provision of a service execution platform for providing multi-media and IP based services requires the control of network resources through a number of complex protocols. The protocols can include legacy protocols based on SS7 and other SIGTRAN protocols, and also IP based protocols such as HTTP, SIP, Radius, Diameter, MSRP, MRCP, RTSP and so on. Application servers such as HttpServlet, SIP Servlet and so on provide an environment for applications which use a particular protocol, but it is difficult to adapt such servers to new protocols.

To provide for portable service applications, it is known to provide a further API which can sit on top of a protocol stack to provide a network layer independent API, but again such API's are proliferating, such as the JAIN family of protocol API's. The growing numbers of possible interfaces and protocols can hinder the development and provision of new services and protocols.

SUMMARY OF THE INVENTION

According to a first aspect of the invention, we provide an interface module for a telecommunications network service entity, the interface module being operable to communicate with an application provided on the telecommunications network service entity and a protocol stack of the telecommunications network service entity, the interface module comprising a generic container to communicate with the application and a protocol connector operable to communicate with an API of the protocol stack and with the generic container, wherein the protocol connector may be operable to receive a message from the protocol stack API in accordance with a corresponding protocol, and pass the message to the generic container, which passes the message to the application.

The protocol connector may be operable to act as a listener to receive the message from the protocol stack API.

The generic container may be operable to deploy one of a plurality of protocol connectors corresponding to the required protocol stack.

The generic container receives protocol information from the protocol connector when the protocol connector may be deployed.

The protocol connector may be operable to instantiate the required protocol resources.

The generic container may be operable to permit deployment of the application when the protocol connector confirms that the required protocol resources are available.

The generic container may have a generic container API to communicate with the application.

BRIEF DESCRIPTION OF THE DRAWINGS

An embodiment of the present invention will now be described by way of example only with reference to the accompanying drawings wherein:

FIG. 5 is a diagram of a method of passing a message.

DETAILED DESCRIPTION OF THE PREFERRED EMBODIMENTS

Figure 1:
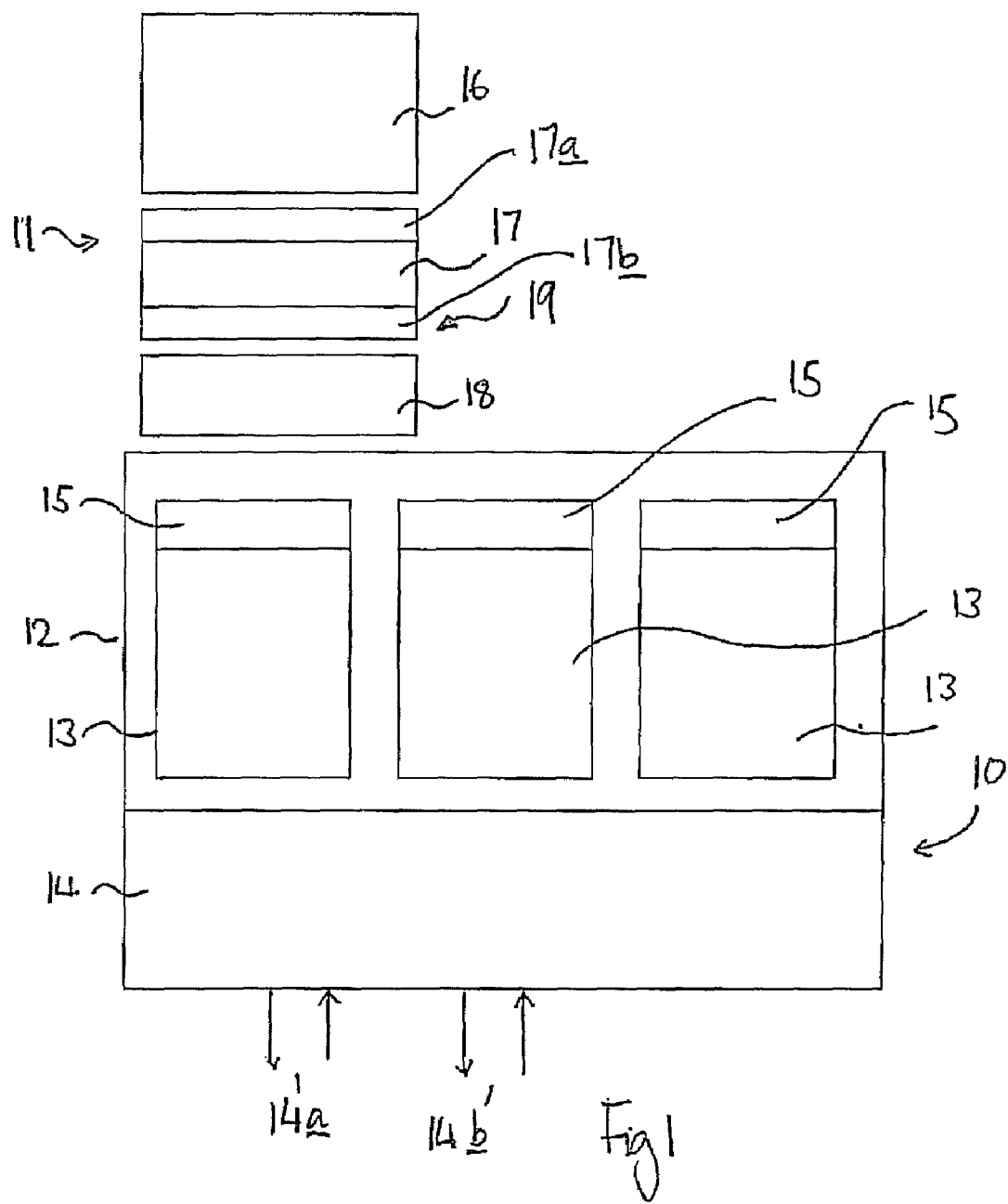
FIG. 1 is a diagrammatic illustration of a telecommunication service platform embodying the present invention.
Figure 2:
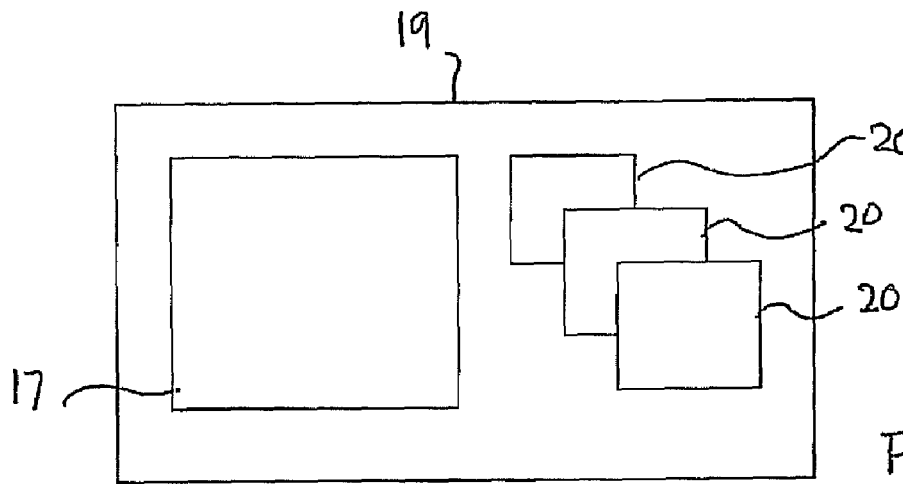
FIG. 2 is a diagrammatic illustration of an interface module embodying the present invention.

Referring to FIG. 1, an appropriate computer system for providing a plurality of services, hereinafter referred to as a telecommunication network service entity, is shown generally at 10. Starting at the top, a service layer is generally shown at 11. The service layer 11 includes all the programs or service applications which provide services running on the platform 10, including interpreters and service wrappers where appropriate. The service layer 11 overlies a communication layer 12 which gives access to network, media and system resources, and this includes a plurality of protocol stacks generally shown at 13. At 14, a hardware layer is shown, including the physical components necessary to provide data connection channels 14a and signalling channels 14b generally to establish and receive calls over a telecommunication network. Each protocol stack 13 is provided with an appropriate interface 15, in the form of an application programming interface ("API"). The API 15 provides a set of functions which may be called by a service application and through which the protocol stack may be accessed.

An application to provide a service is shown at 16 running in the service layer 11. To provide for inter-operability between the application 16 and a protocol stack 13, an interface module 19 comprising a generic container 17 and a protocol connector 18 is provided between the application 16 and the protocol stack API 15 as will be discussed in more detail below. The protocol corrector 18 communicates with the protocol stack API 15. The generic container 17 provides a generic container application programming interface 17a which communicates with the application 16, and a service provider interface 17b which communicates with the protocol corrector 18.

Figure 3:
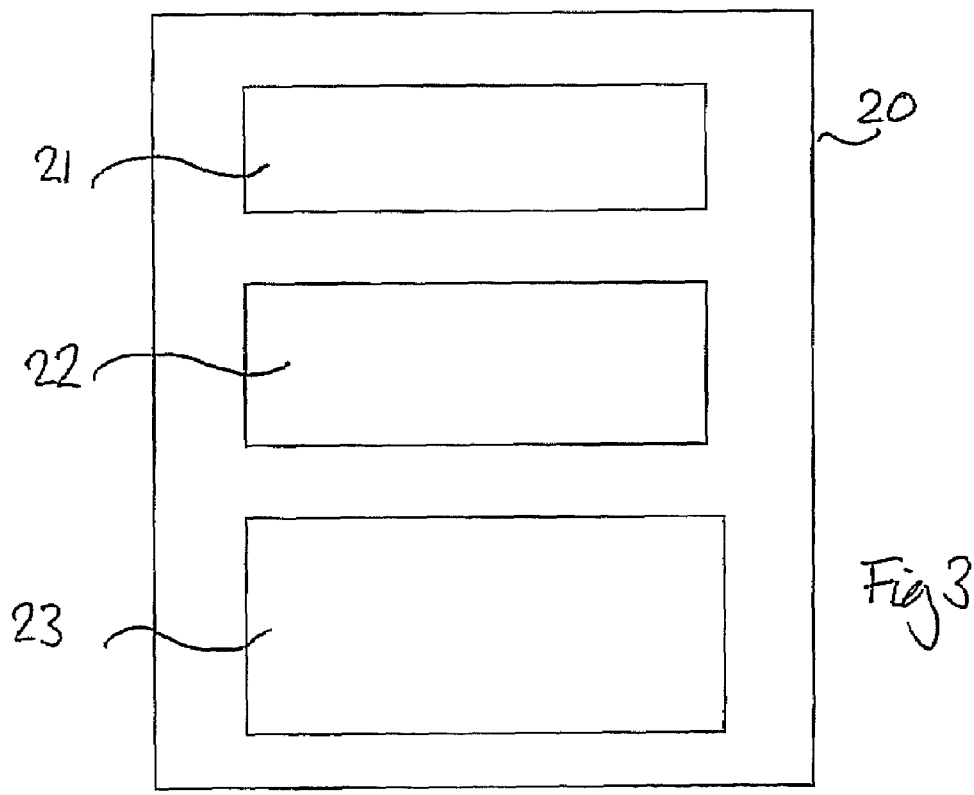
FIG. 3 is a diagrammatic illustration of a protocol connector archive.

To provide communication with different protocol stacks with varying APIs, the interface module 19 is provided with access to one or more protocol connector files generally shown at 20. Each of the protocol connector files comprises an archive file requiring the necessary information to instantiate a protocol resource, particularly a desired protocol stack 13, and provide the necessary information to the generic container 17 to facilitate deployment of the stack. As illustrated in FIG. 3, a protocol connector file 20 comprises a connector deployment descriptor 21 which defines the major information required by the protocol connector such as the root classes, the factory classes and other information as desired. At 22, the protocol connector bytecode is shown, and at step 23 the protocol-specific rules required for the generic container 17. The protocol-specific rules enable the generic container 17 to interact with the application 16 through the generic container 17b in an appropriate manner connected with the protocol and perform protocol-specific actions as needed. Although FIG. 3 shows the protocol connector file as being associated with interface module 19, the protocol connector could instead packaged the corresponding protocol stack.

Figure 4:
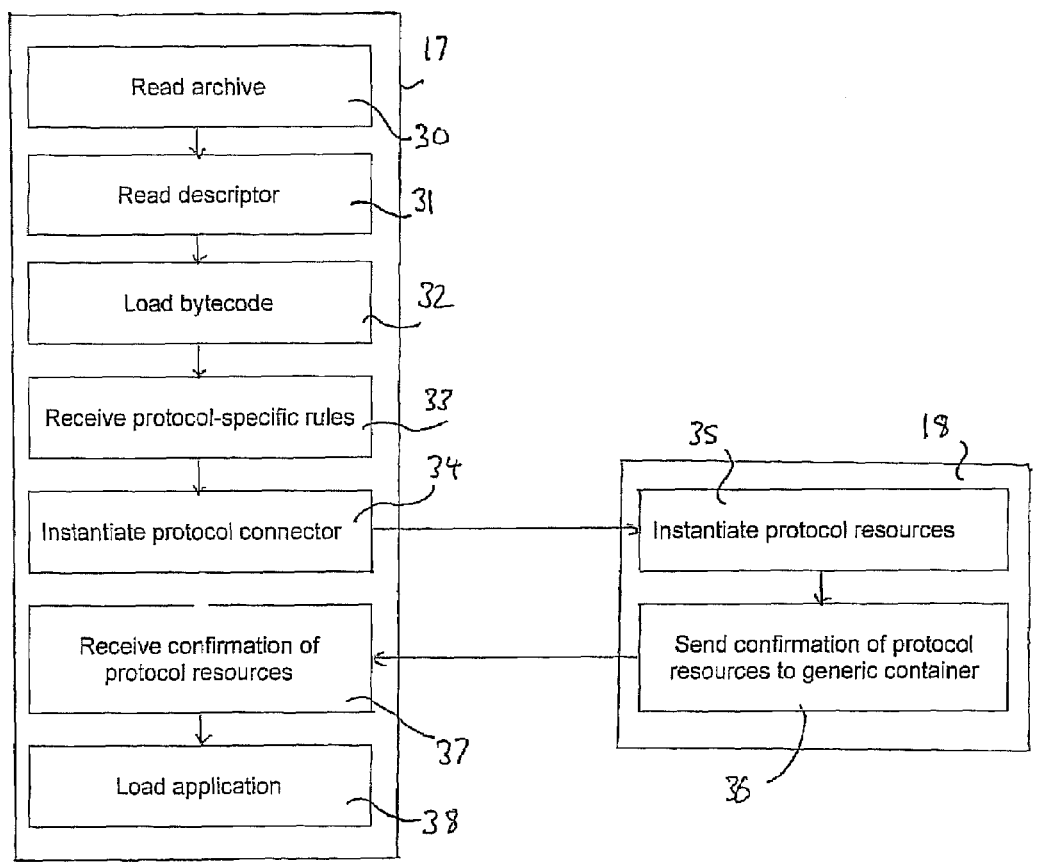
FIG. 4 is a diagram of a method of operating an interface module.

When it is desired to provide a new protocol stack for a new application 16, the interface module 19 is operable as shown in FIG. 4. At step 30, the generic container 17 reads the archive 20 corresponding to the protocol connector, for example by unzipping a zip file containing the archive, or otherwise. At step 31, the general container reads the connector deployment descriptor 21, and at step 32 loads the byte code for the protocol connector 18. At step 33, the generic container 17 reads the protocol-specific rules description 23 and at step 34, instructs the protocol connector 18 to instantiate the required protocol resources. The protocol connector 18 instantiates the resources as shown at step 35, and at step 36 reports to the generic container the list of protocol resources it has instantiated, for example one or more protocol stacks 13, and provides a unique identifier for each resource. At step 37, the generic container 17 receives confirmation of the instantiated protocol resources, and providing the application can be provided with the necessary protocol resources, loads the application 16 at step 38. When a connector/protocol stack is deployed by the generic container 17, it registers to the container and provides a factory: A factory is a mechanism that can be invoked to instantiate the objects of the connector and protocol stack, even though the container has no knowledge of the classes provided by the connector/stack. This permits the container to remain protocol agnostic.

As shown in FIG. 5 the protocol connector 19 appears as a listener to the API 15 and so when there is a signalling event, the event is duly received via the protocol connector 18, as shown at step 39. At step 40, the protocol connector packages the protocol-specific message in a generic format, and sends the event to the generic container SPI 17b. The generic container 17 then processes the message at step 41 and forwards the messages or events to the application 16 in a protocol-agnostic manner through the generic container API 17a at step 42. The generic container 17 cannot process protocol-specific events, so by encapsulating events in a generic manner the events can be passed to the application 16 without requiring any protocol-specific action from the generic container 17.

Accordingly, it will be apparent that the interface module 19 as described herein provides complete independence between the generic container, the application 16 and the protocol stacks 13 used by the application 16. The protocol stacks 13, the interface module 19 and the application 16 can be packaged and deployed separately. The generic container 17 is run first, the appropriate protocol connector 18 is instantiated, the appropriate protocol resources are activated, and the application 16 is then only deployed when all the protocol resources which it requires is available. The generic container is completely protocol-independent, and all the protocol-specific information required is packaged in the protocol-specific rules description 23 in the archive. Consequently, a new protocol stack may be provided simply by providing an appropriate archive 20 without needing to modify the generic container. Accordingly, it will be apparent that new protocols may be provided and new applications 16 provided in the application layer 11 without needing to perform recompilation or reinstallation of the platform 10 or the applications.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. An interface module stored on a non-transitory computer readable medium for a telecommunications network service entity, the interface module being operable to communicate with an application provided on the telecommunications network service entity and a protocol stack of the telecommunications network service entity, the interface module comprising:
    a generic container executed by hardware to communicate with the application; and
    a protocol connector executed by the hardware to communicate with an API of the protocol stack and with the generic container,
    wherein the protocol connector is to receive a message from the protocol stack API in accordance with a corresponding protocol, package the message in a generic format and pass the message in the generic format to the generic container, which passes the message to the application,
    wherein the generic container is operable to deploy one of plurality of protocol connectors corresponding to a required protocol stack,
    wherein the protocol connector is operable to instantiate required protocol resources of the required protocol stack, and
    wherein the generic container is operable to permit deployment of the application when the protocol connector confirms that the required protocol resources are available.

2. An interface module according to claim 1 wherein the protocol connector is operable to act as a listener to receive the message from the protocol stack API.

3. An interface module according to claim 1, wherein the generic container receives protocol information from the protocol connector when the protocol connector is deployed.

4. An interface module according to claim 1 wherein the generic container has a generic container API to communicate with the application.

5. An interface module according to claim 1 wherein the generic container processes the message received in the generic format from the protocol connector.

6. An interface module according to claim 5, wherein the processing performed by the generic container does not include processing protocol-specific events.

7. An interface module according to claim 5, wherein the generic container passing the message to the application includes passing the processed message to the application in a protocol-agnostic manner, wherein the protocol-agnostic manner includes the generic container having no knowledge of classes provided by the protocol stack.

8. An interface module according to claim 7,
    wherein the generic container passes the message to the application through a generic container application program interface.

9. A telecommunication network service computer system comprising:
    a hardware layer to execute a generic container to communicate with an application, and to execute a protocol connector to communicate with an API of a protocol stack and with the generic container,
    wherein the protocol connector is to receive a message from the protocol stack API in accordance with a corresponding protocol, package the message in a generic format and pass the message in the generic format to the generic container, which passes the message to the application, wherein the generic container is operable to deploy one of plurality of protocol connectors corresponding to a required protocol stack, wherein the protocol connector is operable to instantiate required protocol resources of the required protocol stack, and wherein the generic container is operable to permit deployment of the application when the protocol connector confirms that the required protocol resources are available.

10. The telecommunication network service computer system of claim 9, wherein the generic container processes the message received in the generic format from the protocol connector.

11. The telecommunication network service computer system of claim 10, wherein the processing performed by the generic container does not include processing protocol-specific events.

12. The telecommunication network service computer system of claim 10, wherein the generic container passing the message to the application includes passing the processed message to the application in a protocol-agnostic manner, wherein the protocol-agnostic manner includes the generic container having no knowledge of classes provided by the protocol stack.

* * * * *

UNITED STATES PATENT AND TRADEMARK OFFICE
CERTIFICATE OF CORRECTION

| | |
|---|---|
| PATENT NO. | : 8,327,389 B2 |
| APPLICATION NO. | : 12/375729 |
| DATED | : December 4, 2012 |
| INVENTOR(S) | : Marc Lamberton et al. |

It is certified that error appears in the above-identified patent and that said Letters Patent is hereby corrected as shown below:

In the Claims:

In column 4, line 24, in Claim 1, after "one of" insert -- a --.

In column 5, line 5, in Claim 9, before "plurality" insert -- a --.

Signed and Sealed this
Twenty-third Day of April, 2013

Teresa Stanek Rea
*Acting Director of the United States Patent and Trademark Office*